United States Patent
Wang et al.

(10) Patent No.: US 12,086,605 B2
(45) Date of Patent: Sep. 10, 2024

(54) APPLICATION INVOCATION IMPLEMENTATION METHOD, APPARATUS, AND ELECTRONIC DEVICE

(71) Applicant: Lenovo (Beijing) Limited, Beijing (CN)

(72) Inventors: Helai Wang, Beijing (CN); Tao Yang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 70 days.

(21) Appl. No.: 17/990,631

(22) Filed: Nov. 18, 2022

(65) Prior Publication Data
US 2023/0161597 A1 May 25, 2023

(30) Foreign Application Priority Data
Nov. 24, 2021 (CN) .......................... 202111404032.4

(51) Int. Cl.
*G06F 15/177* (2006.01)
*G06F 9/00* (2018.01)
*G06F 9/4401* (2018.01)

(52) U.S. Cl.
CPC ................. *G06F 9/4401* (2013.01)

(58) Field of Classification Search
CPC .. G06F 9/4401; G06F 9/44521; G06F 9/4482; G06F 9/544
See application file for complete search history.

(56) References Cited

U.S. PATENT DOCUMENTS

| | | | | |
|---|---|---|---|---|
| 6,564,318 | B1 * | 5/2003 | Gharda | G06F 8/60 713/1 |
| 2005/0177710 | A1 * | 8/2005 | Rothman | G06F 9/44505 713/2 |
| 2008/0046613 | A1 * | 2/2008 | Lai | G06F 9/4401 710/58 |
| 2008/0209202 | A1 * | 8/2008 | Kawahara | G06F 9/4401 713/2 |
| 2009/0019390 | A1 * | 1/2009 | Su | G06F 9/451 715/810 |
| 2009/0319697 | A1 * | 12/2009 | Chou | G06F 9/4401 710/15 |
| 2010/0268924 | A1 * | 10/2010 | Fujii | G06F 9/4401 726/19 |

(Continued)

*Primary Examiner* — Xuxing Chen
(74) *Attorney, Agent, or Firm* — ANOVA LAW GROUP, PLLC

(57) ABSTRACT

An application invocation implementation method includes initializing at least one first application in response to a startup instruction of an electronic device, and generating at least one invocation entry identification each corresponding to one of the at least one first application. The at least one first application is different from second applications running in an operating system of the electronic device. The method further includes mapping the at least one invocation entry identification to a screen of the electronic device for the screen to present the at least one invocation entry identification, and, in response to a selection invocation request for one invocation entry identification of the at least one invocation entry identification, accessing memory address of one first application of the at least one first application corresponding to the one invocation entry identification, and running the one first application.

19 Claims, 13 Drawing Sheets

(56) References Cited

U.S. PATENT DOCUMENTS

| | | | | |
|---|---|---|---|---|
| 2014/0208090 A1* | 7/2014 | Anson | ............... | G06F 21/575 |
| | | | | 713/2 |
| 2016/0162689 A1* | 6/2016 | Martinez | ............ | G06F 9/4406 |
| | | | | 726/1 |
| 2017/0115850 A1* | 4/2017 | Zhao | ............... | H04N 21/8166 |
| 2019/0079776 A1* | 3/2019 | Okayasu | ............ | G06F 9/4401 |
| 2020/0314205 A1* | 10/2020 | Cheng | ............... | H04L 67/60 |

* cited by examiner

APPLICATION INVOCATION IMPLEMENTATION METHOD, APPARATUS, AND ELECTRONIC DEVICE

CROSS-REFERENCE TO RELATED APPLICATION

This application claim priority to Chinese Patent Application No. 202111404032.4, filed on Nov. 24, 2021, the entire content of which is incorporated herein by reference.

TECHNICAL FIELD

The present disclosure relates to the technical field of computer applications and, more particularly, to an application invocation implementation method, apparatus, and electronic device.

BACKGROUND

A basic input and output system (BIOS) setup program is a set of programs (i.e., applications) that are solidified into a BIOS chip on a computer mainboard, providing the lowest-level and most direct hardware settings and controls for a computer to meet its work requirements.

When it is needed to set up a relevant application in the BIOS chip, a user usually needs to trigger designated hotkeys during a computer startup process to enter BIOS mode for application initialization, and timely input preset function hotkeys of an initialization application to invoke the application to run. Once the user misses opportunity to input the function hotkeys of the application, the computer needs to be restarted to enter the BIOS mode for re-operation.

As such, current process of invoking the relevant application in the computer BIOS chip to run and completing the corresponding configuration operation is very cumbersome and has great limitations, which affects user experience.

SUMMARY

In accordance with the disclosure, there is provided an application invocation implementation method including initializing at least one first application in response to a startup instruction of an electronic device, and generating at least one invocation entry identification each corresponding to one of the at least one first application. The at least one first application is different from second applications running in an operating system of the electronic device. The method further includes mapping the at least one invocation entry identification to a screen of the electronic device for the screen to present the at least one invocation entry identification, and, in response to a selection invocation request for one invocation entry identification of the at least one invocation entry identification, accessing memory address of one first application of the at least one first application corresponding to the one invocation entry identification, and running the one first application.

Also in accordance with the disclosure, there is provided an application invocation implementation apparatus a memory storing a program that, when executed by a basic input and output system (BIOS) chip of an electronic device, causes the BIOS chip to initialize at least one first application in response to a startup instruction of the electronic device, and generate at least one invocation entry identification each corresponding to one of the at least one first application. The at least one first application is different from second applications running in an operating system of the electronic device. The program further causes the BIOS chip to map the at least one invocation entry identification to a screen of the electronic device for the screen to present the at least one invocation entry identification, and, in response to a selection invocation request for one invocation entry identification of the at least one invocation entry identification, access memory address of one first application of the at least one first application corresponding to the one invocation entry identification, and run the one first application.

Also in accordance with the disclosure, there is provided an application invocation implementation method including responding to a trigger operation for a specific application and presenting at least one invocation entry identification on a screen of an electronic device. Each of the at least one invocation entry identification corresponds to one of at least one first application. The at least one first application is in a basic input and output system (BIOS) of the electronic device and is different from second applications running in an operating system of the electronic device. The specific application is one of the second applications. The at least one invocation entry identification is generated after the at least one first application is initialized during a startup process of the electronic device. The method further includes generating a memory address query request for a target application in response to a selection invocation operation on the target application. The target application is one of the at least first application presented on the screen. The method also includes sending the memory address query request to the BIOS, receiving target memory address of the target application obtained by the BIOS responding to the memory address query request, and controlling the specific application to load the target application and running the target application according to the target memory address of the target application fed back by the BIOS.

Also in accordance with the disclosure, there is provided an application invocation implementation apparatus a memory storing a program that, when executed by a system processor of an electronic device, causes the system processor to respond to a trigger operation for a specific application and present at least one invocation entry identification on a screen of the electronic device. Each of the at least one invocation entry identification corresponds to one of at least one first application. The at least one first application is in a basic input and output system (BIOS) of the electronic device and is different from second applications running in an operating system of the electronic device. The specific application is one of the second applications. The at least one invocation entry identification is generated after the at least one first application is initialized during a startup process of the electronic device. The program further causes the system processor to generate a memory address query request for a target application in response to a selection invocation operation on the target application. The target application is one of the at least first application presented on the screen. The program also causes the system processor to send the memory address query request to the BIOS, receive target memory address of the target application obtained by the BIOS responding to the memory address query request, and control the specific application to load the target application and run the target application according to the target memory address of the target application fed back by the BIOS.

Also in accordance with the disclosure, there is provided an electronic device including a screen, a mainboard, and a basic input and output system (BIOS) chip and a system processor arranged at the mainboard. The BIOS chip is configured to initialize at least one first application in response to a startup instruction of the electronic device, and generate at least one invocation entry identification each corresponding to one of the at least one first application. The at least one first application is different from second applications running in an operating system of the electronic device. The BIOS chip is further configured to map the at least one invocation entry identification to the screen, for the screen to present the at least one invocation entry identification, and, in response to a selection invocation request for one invocation entry identification of the at least one invocation entry identification, access memory address of one first application of the at least one first application corresponding to the one invocation entry identification, and run the one first application. The system processor is configured to respond to a trigger operation for a specific application and present the at least one invocation entry identification on the screen. The specific application being one of the second applications. The system processor is further configured to generate a memory address query request for a target application in response to a selection invocation operation on the target application and send the memory address query request to a BIOS of the electronic device. The target application is one of the at least first application presented on the screen. The BIOS chip is further configured to respond to the memory address query request to obtain target memory address of the target application. The system processor is further configured to receive the target memory address from the BIOS chip and control the specific application to load the target application and run the target application according to the target memory address of the target application.

BRIEF DESCRIPTION OF THE DRAWINGS

In order to explain the embodiments of the present disclosure more clearly, reference is made to the accompanying drawings, which are used in the description of the embodiments or the existing technology. Obviously, the drawings in the following description are only some embodiments of the present disclosure, and other drawings can be obtained from these drawings without any inventive effort for those of ordinary skill in the art.

DETAILED DESCRIPTION OF THE EMBODIMENTS

Targeting the technical problems described in the background, it is proposed that during an electronic device startup process, it does not need to be constrained by initialization sequence and time of various basic input and output system (BIOS) applications (referred to as first applications in the present disclosure for the convenience of description, i.e., the first applications refer to applications used by BIOS, which are different from second applications running on an operating system of the electronic device), to realize invocation of any first application at any time. Based on this, according to the present disclosure, corresponding invocation entry identifications are generated and displayed on a first screen of the electronic device after the first applications are initialized during the electronic device startup process. In this way, even after BIOS application initializations are completed, a user can select and trigger the invocation entry identification of a first target application that needs to be set up from the invocation entry identifications of at least one first application displayed on the first screen, and invoke the first target application to run. There is no need to restart the electronic device to meet configuration requirements for any first application.

The technical solutions in the embodiments of the present disclosure will be described in detail with reference to the accompanying drawings. Obviously, the described embodiments are only some of rather than all the embodiments of the present disclosure. Based on the described embodiments, all other embodiments obtained by those of ordinary skill in the art without inventive effort shall fall within the scope of the present disclosure.

Figure 1:
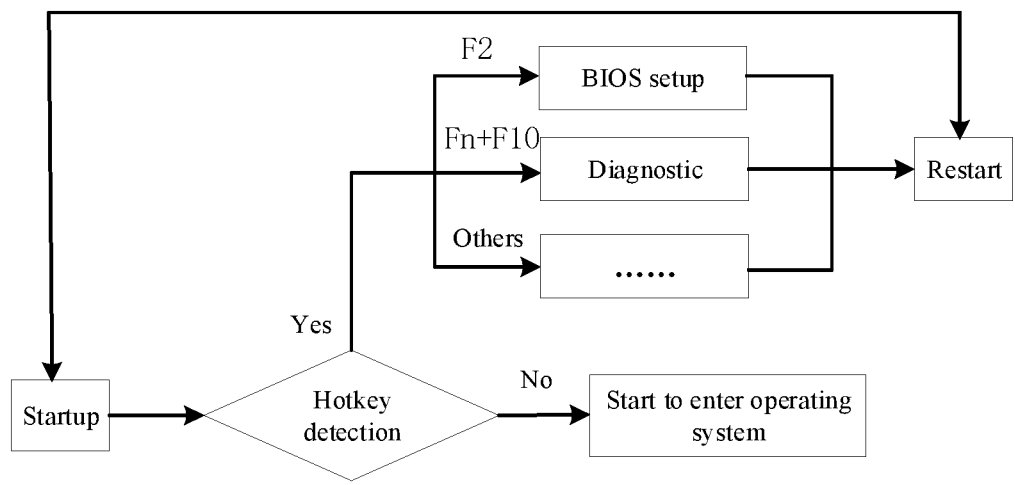
FIG. 1 is a schematic diagram showing an electronic device startup process.

FIG. 1 is a schematic diagram showing an electronic device startup process.

Figure 2:
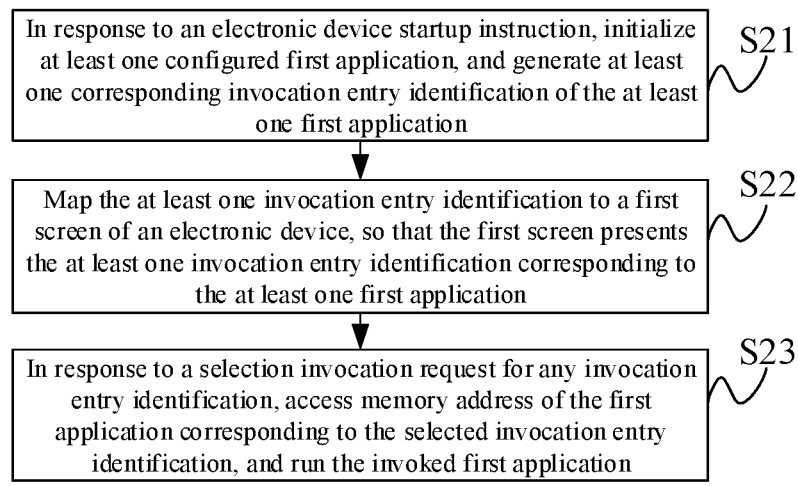
FIG. 2 is a schematic flowchart of an example application invocation implementation method consistent with the present disclosure.

FIG. 2 is a schematic flowchart of an example application invocation implementation method consistent with the present disclosure. The method can be executed by an electronic device, and the electronic device can include but is not limited to a notebook computer, a tablet computer, a netbook, a smart phone, etc. Type of the electronic device that executes the application invocation implementation method can be determined according to scenario requirements. In the present disclosure, the application invocation implementation method being executed by the notebook computer is used as an example for description. The method consistent with the present disclosure is described from the side of a BIOS chip in the electronic device, but is not limited to the following implementation processes. As shown in FIG. 2, the method includes: in response to an electronic device startup instruction, initializing at least one configured first application, and generating at least one corresponding invocation entry identification of the at least one first application (process S21); mapping the at least one invocation entry identification to a first screen of the electronic device, so that the first screen presents the at least one invocation entry identification corresponding to the at least one first application (process S22); and in response to a selection invocation request for any invocation entry identification, accessing memory address of the first application corresponding to the selected invocation entry identification, and running the invoked first application (process S23).

As described above, the first applications in the embodiments of the present disclosure may be relevant applications in the BIOS, which refer to a type of programs that are different from second applications running in the operating system of the electronic device. The first applications may include but are not limited to programs such as BIOS setup, diagnostic, secure wipe, boot select, gaming mode, office mode, etc., which can generally implement initialization and detection of various hardware devices in the electronic device during the electronic device startup process, so as to ensure normal operation of the electronic device. The present disclosure does not limit the type and number of the programs included in the first applications. It can be understood that, for electronic devices with different types or functions, the first applications stored in the BIOS on mainboard may be different, which may depend on the situation, and are not listed one by one in the embodiments of the present disclosure.

The user performs a start or restart operation on the electronic device to generate a startup instruction for the electronic device, so that the electronic device responds to the startup instruction to start and operate normally. During the electronic device startup process, the BIOS working mode is usually entered first, and at least one first application configured in the BIOS is initialized. An implementation process of the initialization of the various first applications is not described in detail herein.

Figure 3:
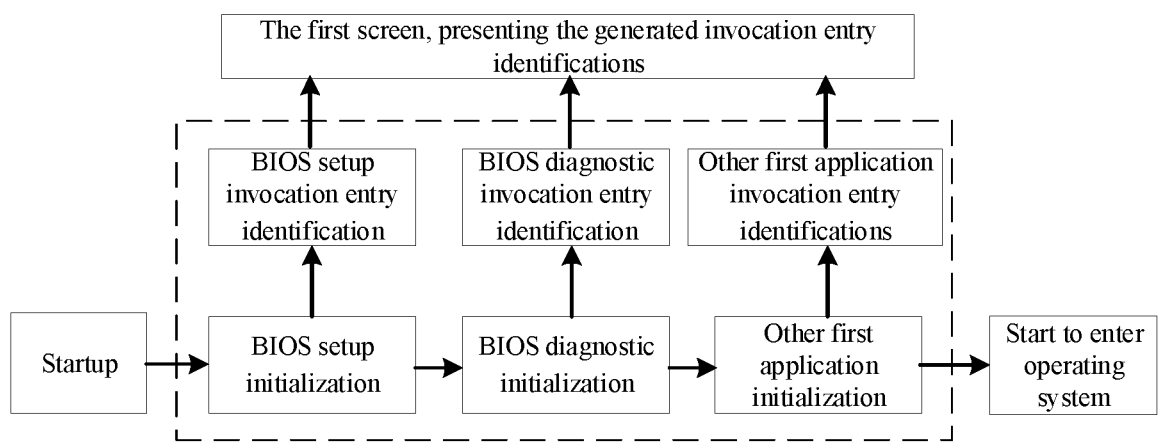
FIG. 3 is a schematic flowchart of generating invocation entry identifications of first applications after BIOS initializations during an electronic device startup process according to an application invocation implementation method consistent with the present disclosure.
Figure 4:
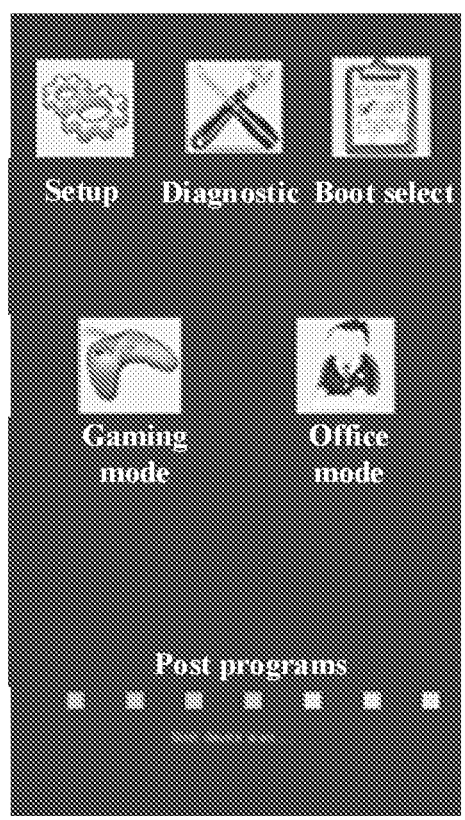
FIG. 4. is a schematic diagram of a first screen presenting invocation entry identifications of first applications according to an application invocation implementation method consistent with the present disclosure.

Referring to FIG. 3, which shows a schematic flowchart of the electronic device startup process according to the application invocation implementation method consistent with the present disclosure, after each first application in the BIOS is initialized, an invocation entry identification of the first application is generated, i.e., the first applications that have completed the initializations are relatively independent to form separate BIOS application usage modes, and the invocation entry identifications that characterize the first applications are generated, such as application icons drawn for different first applications shown in FIG. 4. In some embodiments, type description of the first applications can also be used as the invocation entry identifications in order to reduce data calculation amount. The present disclosure does not limit contents of the invocation entry identifications of the first applications, but it is needed to ensure the uniqueness of the invocation entry identifications of different first applications, so that each first application can be identified subsequently according to the invocation entry identifications.

Generation methods of the invocation entry identifications with different contents may be different, and the present disclosure does not limit implementation methods of the process S21. In a scenario where the invocation entry identifications are the application icons shown in FIG. 4, correspondence relationship between different first applications and their corresponding application icons may be pre-configured in the present disclosure. In this way, after the initialization of any first application is completed, the invocation entry identification of the first application can be drawn according to the correspondence relationship, and an implementation process is not described in detail herein.

In addition, in practical applications, the initializations may be performed in sequence for multiple first applications in the BIOS as shown in FIG. 3. In this way, each time the initialization of a first application is completed, a corresponding invocation entry identification can be generated according to the method described above, so that generation efficiency of the invocation entry identifications is improved and electronic device startup time is shortened. In some embodiments, according to actual needs, after the initializations of multiple first applications are completed, respective invocation entry identifications of multiple first applications may be generated synchronously. The present disclosure does not limit generation trigger conditions of the invocation entry identifications.

According to the present disclosure, the user does not need to enter hotkeys (such as F2, Fn+F10, etc.) at a suitable time during the electronic device startup process to trigger the corresponding application in the BIOS to run. Instead, after the start or restart operation is input on the electronic device, the electronic device responds to the startup instruction such as start or restart, to actively trigger the initializations of the first applications in the BIOS and generate the invocation entry identifications corresponding to the initialized first applications, which greatly simplifies user's operation and better meets application needs of ordinary users.

The method consistent with the disclosure also solves the technical problem that during the startup process of the electronic device, once a time point of inputting the triggering hotkeys of the first applications is missed, the first applications cannot be entered during the current startup and running process of the electronic device. In some embodiments, after the first applications are initialized, the invocation entry identifications are automatically generated and mapped to the first screen of the electronic device, that is, a correspondence relationship between the first screen and the generated invocation entry identifications is established, so that the first screen can present the generated invocation entry identifications of the first applications after it is powered on and enters a display state as shown in FIG. 4.

In this way, during a sequential initialization process of multiple first applications in the BIOS, if first application A that has completed initialization and an initialization operation of its next adjacent first application B has started or completed (the first application that has just completed initialization is not included here) needs to be run, the invocation entry identification of the first application A can be selected from one or more invocation entry identifications displayed on the first screen to be triggered, which is very convenient and the electronic device does not need to be restarted.

In order to display the invocation entry identifications of the first applications in time, the first screen may be turned on during the power-on and startup process of the electronic device to enter the display state, and the invocation entry identifications of the first applications in the BIOS can be directly displayed on the first screen after being generated. In this way, after each first application is sequentially initialized and the corresponding invocation entry identifications are sequentially generated, the invocation entry identifications can be directly displayed on the first screen in sequence. The present disclosure does not limit layout of the respective invocation entry identifications of the multiple first applications presented on the first screen, which may depend on the situation.

It can be understood that in the present disclosure, multiple invocation entry identifications can also be displayed on the first screen at the same time after the invocation entry identifications of the first applications in the BIOS are generated. The present disclosure does not limit implementation method of displaying the various invocation entry identifications on the first screen, and the various invocation entry identifications include but are not limited to the contents shown in FIG. 4.

The first screen of the electronic device can be any display screen or extended display screen of the electronic device, and the electronic device can have multiple screens. Referring to schematic diagram of an application scenario of a double-sided screen notebook computer shown in FIG. 5A, a display screen on C side of the notebook computer can be referred to as the first screen, and a display screen on B side can be referred to as a second screen. As used in this disclosure A side, B side, C side, and D side of a notebook computer refer to a top side, a main screen side, a keyboard side, and a bottom side of the notebook computer. As described above, during notebook computer startup process, the second screen can be started to enter the display state in response to the startup instruction, and a startup interface of the electronic device can be output on the second screen. In this way, relevant contents during the electronic device startup process, such as the first application initialization process, etc., can be presented on the startup interface. The present disclosure does not limit the output contents of the startup interface, which may depend on the situation.

Figure 5A:
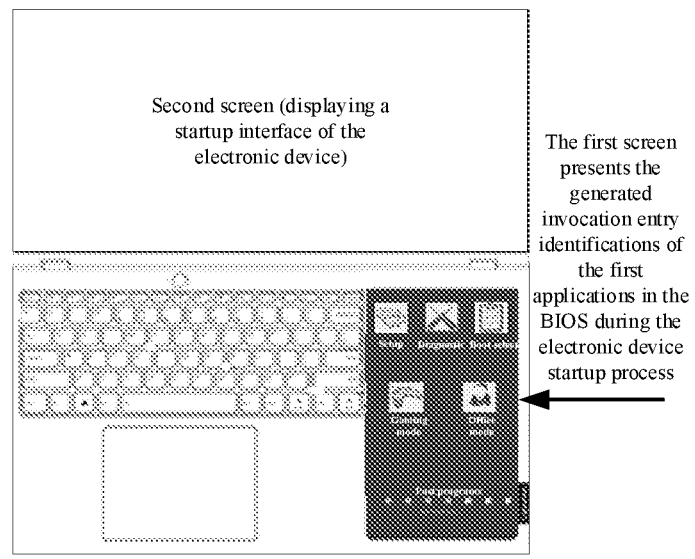
FIG. 5A is a schematic diagram of an example scenario in which a first screen presents invocation entry identifications of first applications according to an application invocation implementation method consistent with the present disclosure.

In addition, during the notebook computer startup process as shown in FIG. 5A, the generated invocation entry identifications of the first applications can be presented on the first screen on the C side, so that it is not convenient for the user to select the relevant first application in the BIOS to be run without affecting user's viewing of displayed content of the second screen. As for the implementation process of how to output the invocation entry identifications on the first screen, reference may be made to the relevant description above. Arrangement relationship among multiple screens of the electronic device configured with multiple or extended screens includes but is not limited to the implementation shown in FIG. 5A. The application invocation implementation methods for different multi-screen electronic devices are similar, and examples are not described in detail herein.

Figure 5B:
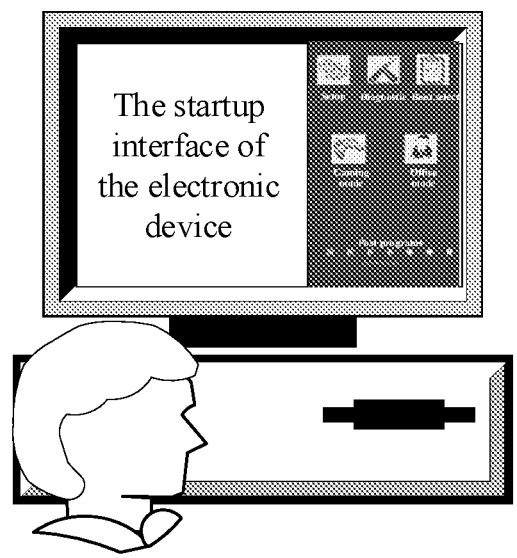
FIG. 5B is a schematic diagram of another example scenario in which a first screen presents invocation entry identifications of first applications according to an application invocation implementation method consistent with the present disclosure.

In some embodiments, the electronic device may also have one display screen, as shown in FIG. 5B. In this case, in order to meet the requirement of outputting the startup interface of the electronic device, the first screen may be one part of display area of the display screen of the electronic device, and the other part of the display area may be used to output the startup interface of the electronic device. In some other embodiments, if the startup interface of the electronic device does not need to be presented, the first screen described above may refer to at least part of the display area of the display screen of the electronic device. It can be seen that in some scenarios, the generated invocation entry identifications may be presented in the entire display area of the display screen, which is not limited in the present disclosure.

During the electronic device startup process, the invocation entry identifications of the initialized first applications are presented on the first screen, so that when any first application needs to be run, the invocation entry identification of the first application to be run can be selected directly from the invocation entry identifications presented on the first screen to trigger. Triggering method is not limited in the present disclosure, and may include but is not limited to touch triggering, voice triggering, preset hotkey triggering, etc.

In this way, the electronic device responds to user's selection invocation request for any presented invocation entry identification, and the BIOS can directly access the memory address of the corresponding first application to run the first application to meet user's corresponding configuration requirements. For the relevant first application in the BIOS, related information after initialization is usually written to memory space allocated to the BIOS in the electronic device, and the corresponding memory address is recorded, so that the BIOS can access application information stored to the memory address accordingly and run the corresponding first application. The initialization process of the relevant first application in the BIOS and implementation process of application information storage after initialization are not described in detail herein.

In summary, in the embodiments of the present disclosure, after the electronic device responds to the startup instruction, at least one relevant first application in the BIOS is automatically initialized, without the need for the user's trigger to start. For the initialized first applications, the corresponding invocation entry identifications are automatically generated and presented on the first screen entering the display state, i.e., relevant application entry in the BIOS is displayed on the first screen, which is easy for the user to understand and operate. After that, the user can directly trigger the invocation entry identification of the first application to be run from the displayed invocation entry identifications, and the electronic device does not need to be restarted. The BIOS can directly access the memory address of the selected and triggered first application to run the first application, which greatly reduces user's waiting time, improves application configuration efficiency of the electronic device, and improves user experience.

For the relevant first application in the BIOS described above, consistent with the disclosure, after exiting BIOS environment (i.e., the BIOS mode), the electronic device can directly invoke any first application without being restarted. For example, after the operating system of the electronic device is started to run, the first applications in the BIOS can be invoked during the operation of the operating system; or the first applications in the BIOS can be invoked in unified extensible firmware interface (UEFI) Shell (i.e., shell program during startup) environment, so as to expand the scope of use of the BIOS application. Based on this, an application invocation implementation method described in the following embodiments is provided by the present disclosure, but the method consistent with the present disclosure is not limited to the one described in the following embodiments.

In combination with the application invocation implementation method executed during the electronic device startup process described above, after the initializations of the first applications are completed, memory address space of this type of applications can be isolated, so that the operating system can invoke the memory address of the first applications through the BIOS. At the same time, according to the method described above, the corresponding invocation entry identifications can be presented on the first screen, so that the initialized first applications form a separate usage mode, which is convenient for the user to invoke at any time.

In practical applications of the present disclosure, based on the BIOS, system memory of the electronic device can be divided into: Address Range Non-Volatile Storage (NVS) (usually used when the operating system sleeps), Address Range Memory (usually used when the operating system is running normally), and OEM Defined (i.e., custom memory space, used for OEM function development and unavailable to the operating system).

Figure 6:
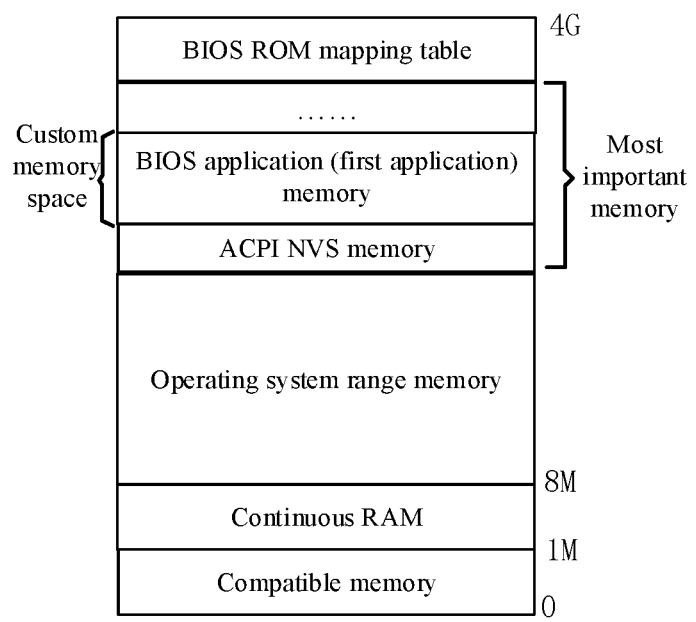
FIG. 6. is a schematic structural diagram of a system memory of an electronic device according to an application invocation implementation method consistent with the present disclosure.

Based on the description above and referring to a schematic structural diagram of the system memory shown in FIG. 6, a partition processing on the memory space (which may be a memory address range used by the BIOS) of the electronic device can be performed to obtain a custom memory space for storing the first applications in the BIOS, and the memory address of the custom memory space is marked as unavailable to the operating system to realize BIOS application memory isolation. The implementation process is not described in detail herein. In this case, after the first applications are initialized during the electronic device startup process, the corresponding memory address space may be marked as the custom memory space, so that access to the memory address in the custom memory space in the operating system is denied. The implementation method of the BIOS memory isolation is not described in detail herein.

Since the custom memory space is completely available to the BIOS, the BIOS itself can access the memory address of the invoked first applications stored in the custom memory space to run the invoked first applications. In some embodiments of the present disclosure, since the UEFI Shell environment is similar to the BIOS environment, after a certain invocation entry identification displayed on the first screen is selected in the UEFI Shell environment, the UEFI Shell can also directly invoke the memory address of the first application to run the selected first application. The implementation process is similar to the implementation process in which the BIOS invokes the first application, and reference may be made to the corresponding description above, which is not repeated herein.

In some other embodiments of the present disclosure, the first applications in the BIOS may also be invoked during the operation of the operating system. Based on this, the following implementation method for invoking the BIOS applications in the operating system environment is provided by the present disclosure, but the method consistent with the present disclosure is not limited to the one described in the following embodiments.

Figure 7:
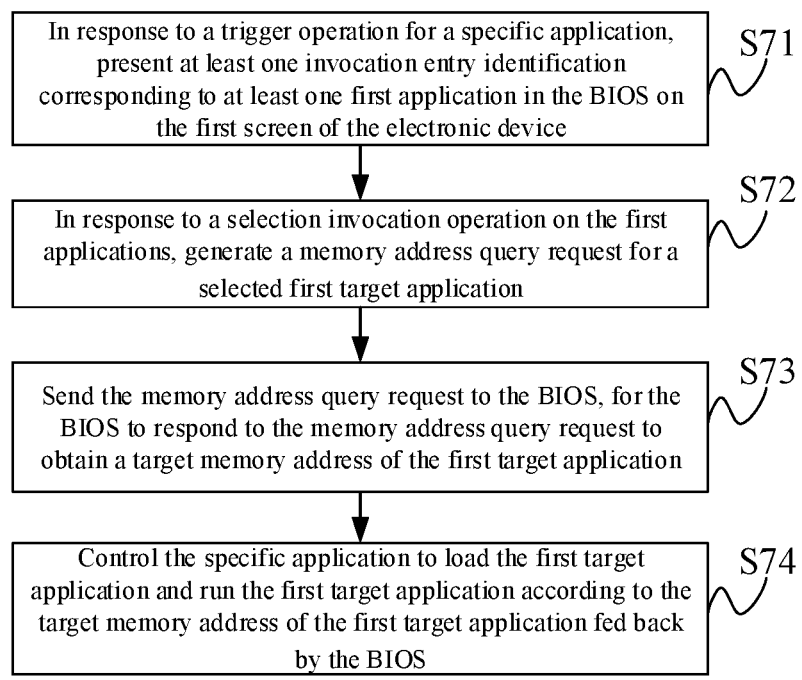
FIG. 7. is a schematic flowchart of another example application invocation implementation method consistent with the present disclosure.

FIG. 7 is a schematic flowchart of another example application invocation implementation method consistent with the present disclosure. Descriptions of how to implement a process of BIOS application invocation after the operating system of the electronic device starts and runs are provided in the embodiments. The descriptions are from the side of the operating system, and the method can be executed by a system processor such as a central processing unit (CPU) of the electronic device. As shown in FIG. 7, the method includes: in response to a trigger operation for a specific application, presenting at least one invocation entry identification corresponding to at least one first application in the BIOS on the first screen of the electronic device (process S71); in response to a selection invocation operation on the first applications, generating a memory address query request for a selected first target application (process S72); sending the memory address query request to the BIOS, for the BIOS to obtain a target memory address of the first target application in response to the memory address query request (process S73); controlling the specific application to load the first target application and running the first target application according to the target memory address of the first target application fed back by the BIOS (process S74).

With reference to the relevant descriptions above, the invocation entry identifications may be generated for the initialized first applications during the electronic device startup process, and the implementation process will not be described in detail herein. The specific application is based on the second application, and is a special application program running and pre-installed by the operating system for invoking the first applications in the BIOS. The present disclosure does not limit the configuration implementation method of the specific application, which may depend on application requirements.

After the electronic device completes the first application initializations in the startup process and the operating system is successfully started according to the method described above, the user can use application functions in the electronic device normally. In this scenario, if one or more first applications in the BIOS need to be invoked, the user can trigger the specific application to run, and the corresponding invocation entry identifications of at least one first application in the BIOS are presented on the first screen. In this way, the user does not need to restart the electronic device, and can select the invocation entry identification of the first application to be invoked from the invocation entry identifications presented on the first screen.

The above-mentioned scenario in which the double-sided screen notebook computer implements the application invocation implementation method is taken as an example. Referring to a schematic diagram of a scenario shown in FIG. 8, the specific application can be presented on B-side screen (i.e., the second screen) of the electronic device, that is, after the operating system of the electronic device is started, entry identifications of the specific application can be presented on the second screen of the electronic device, so that the user can trigger the entry identifications to start the specific application. In some other embodiments, in order to avoid interference with the user's use of other applications, the specific application can also be presented on the first screen, and then the user can operate other applications presented on the second screen. Schematic presentation manners of the specific application are shown in left drawings of FIG. 8.

For electronic devices with other screen structures, such as the single-screen electronic device shown in FIG. 5B, the entire display area of the screen can be divided into at least two display areas according to application functions, which are respectively used to display the specific application and the various invocation entry identifications, or are respectively used to display the specific application or other types of applications running in the operating system. The present disclosure does not limit display of the specific application and its relationship with the first screen, which may depend on the situation.

Then, as for the displayed specific application, the user can use any preset startup mode configured for the specific application to trigger the specific application, so that the operating system of the electronic device can detect the corresponding trigger operation. For example, after the trigger operation on the entry identification of the specific application is detected, the specific application can be started, and at least one invocation entry identification of the first application in the BIOS is presented on the first screen, as shown in middle drawing of FIG. 8. Presentation manner is not limited hereto.

The preset startup modes preconfigured for the specific application may include, but are not limited to, a hotkey startup mode, a voice startup mode, a preset gesture startup mode, a touch startup mode, etc., which can be configured according to actual situation. It can be understood that in the present disclosure, one or more preset startup modes can be preselected for the specific application, so that the user can select and use according to invocation scenario, which improves flexibility and convenience of application triggering.

As can be seen from the above relevant description of the memory address of the first applications in the BIOS, the memory isolation of the first applications is realized in advance in the present disclosure, so that the memory addresses for the first applications become not available to the operating system. Therefore, after the user selects the invocation entry identification of the first target application to be run from the invocation entry identifications presented on the first screen, the memory address query request for the first target application is generated and sent to the BIOS, so as to obtain the memory address of the first target application through the BIOS.

Figure 9:
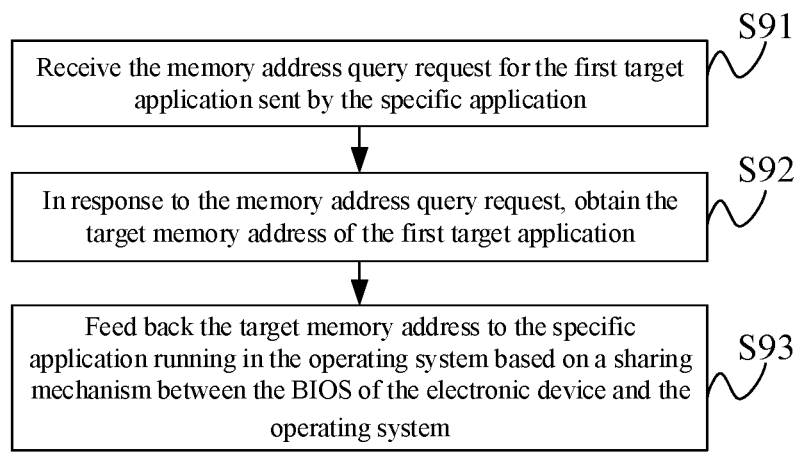
FIG. 9. is a schematic flowchart of another example application invocation implementation method consistent with the present disclosure.

As for an implementation process of how the BIOS accesses the memory address of the first target application, reference may be made to, but not limited to, an implementation method shown in FIG. 9. The application invocation implementation method shown in FIG. 9 can be executed by the BIOS chip. During the operation of the operating system, in order to obtain the target memory address of the first target application invoked by the operating system, the following processes are performed: receiving the memory address query request for the first target application sent by the specific application (process S91); in response to the memory address query request, obtaining the target memory address of the first target application (process S92); and feeding back the target memory address to the specific application running in the operating system based on a sharing mechanism between the BIOS of the electronic device and the operating system (process S93).

Following the above description, it can be known that the first target application may refer to any first application presented on the first screen, and the user may select according to actual needs. The memory address query request may include but is not limited to an application identification of the first target application, so that the BIOS knows which first application the operating system wants to invoke, and the application identification may include but is not limited to a unique identification, a serial number, etc. of the application.

Since the operating system cannot directly access the memory address of the first applications, it will actively query the BIOS for OEM Defined memory address which is the preset custom memory space for storing the first applications, so that the BIOS can feed back the target memory address corresponding to the first target application to the specific application through UEFI Variable (i.e., the sharing mechanism between the BIOS and the operating system, the working principle of which is not described in detail herein). The implementation method consistent with the present disclosure is not limited hereto.

According to the method described above, after the specific application running in the operating system obtains the target memory address of the first target application, the first target application can be loaded, and the first target application can be run through the specific application, which realizes running the relevant applications in the BIOS in the operating system.

Figure 8:
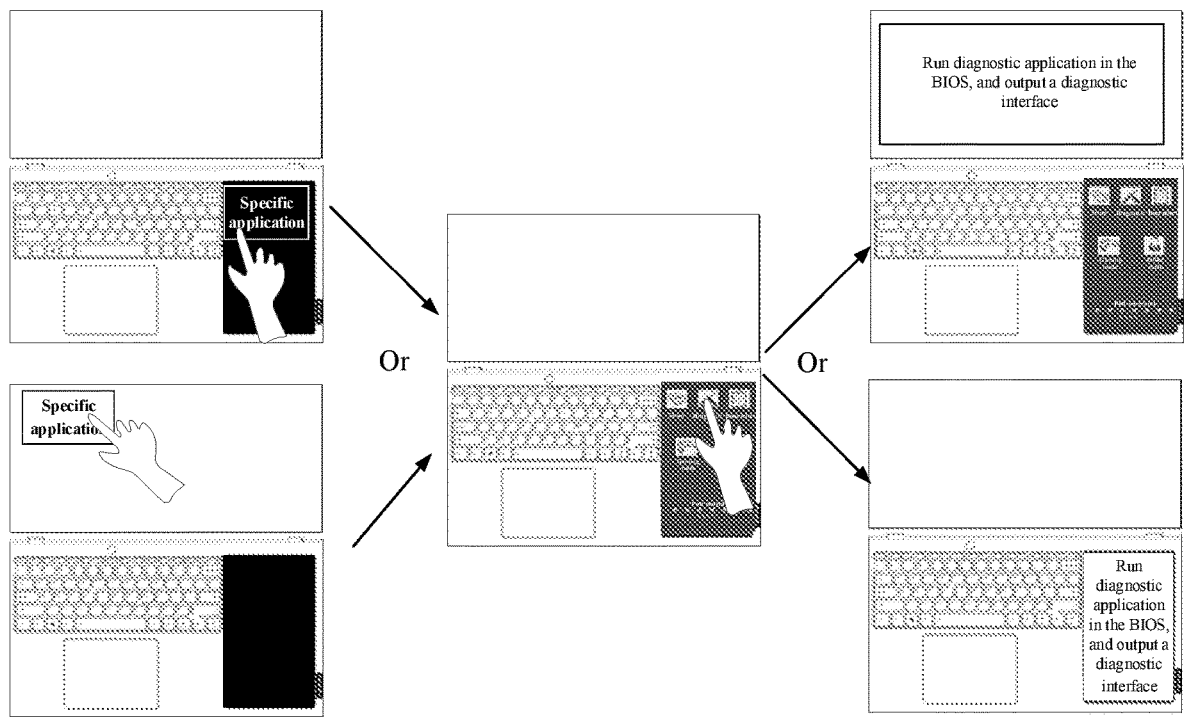
FIG. 8. is a schematic diagram of an example application scenario of an application invocation implementation method consistent with the present disclosure.

Referring to the schematic diagram of the scenario shown in FIG. 8, when the operating system of the electronic device runs the first target application through the specific application, content of the running first target application, such as a diagnostic interface of a diagnostic application in the BIOS, can be presented on the first screen or the second screen as shown in right drawings of FIG. 8. For electronic devices with other structures, operation process of the first target application is displayed in a similar manner, which is not described in detail herein.

In summary, in the embodiments of the present disclosure, for the various first applications initialized in the BIOS, the corresponding invocation entry identifications can be generated and associated with the specific application running in the operating system. In this way, during the startup and running process of the operating system, the user can directly start the specific application if the first applications in the BIOS need to be invoked. The invocation entry identifications of the various first applications can be presented on the first screen, so that the user can also select the presented invocation entry identification of the first target application, and the invocation of the first target application in the BIOS can be realized. The first target application is run through the specific application, which meets invocation and configuration requirements of the BIOS applications in the operating system, and the electronic device does not need to be restarted, so that processing efficiency and convenience as well as the user experience are greatly improved.

Figure 10:
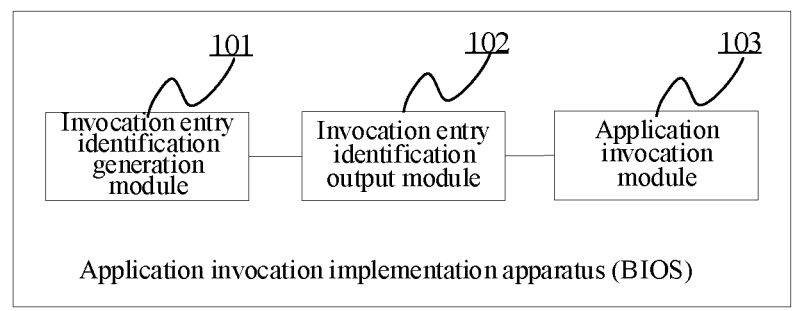
FIG. 10 is a schematic structural diagram of an example application invocation implementation apparatus consistent with the present disclosure.

FIG. 10 is a schematic structural diagram of an example application invocation implementation apparatus consistent with the present disclosure. A composition structure of the application invocation implementation apparatus is described from the side of the BIOS chip of the electronic device. As shown in FIG. 10, the apparatus includes an invocation entry identification generation module 101, an invocation entry identification output module 102, and an application invocation module 103. The invocation entry identification generation module 101 is configured to initialize at least one configured first application in response to the electronic device startup instruction, and generate the corresponding invocation entry identifications of the first applications. The first applications refer to applications different from the second applications running in the operating system of the electronic device. The invocation entry identification output module 102 is configured to map the invocation entry identifications to the first screen of the electronic device, and present the invocation entry identifications corresponding to the first applications on the first screen. The application invocation module 103 is configured to access the memory address of the first application corresponding to the selected invocation entry identification in response to the selection invocation request for any invocation entry identification, and run the invoked first application.

In some other embodiments, the apparatus may further include a memory isolation module. The memory isolation module is configured to partition the memory space to obtain the custom memory space for storing the first applications, and the memory address of the custom memory space is marked as unavailable to the operating system.

In some other embodiments, the apparatus may further include a memory address query request reception module, a target memory address acquisition module, and a target memory address feedback module. The memory address query request receiving reception is configured to receive the memory address query request for the first target application sent by the specific application during the operation of the operating system of the electronic device. The specific application belongs to the second application, and the first target application refers to any one of the first applications presented on the first screen. The target memory address acquisition module is configured to obtain the target memory address of the first target application in response to the memory address query request. The target memory address feedback module is configured to feed back the target memory address to the specific application running in the operating system based on the sharing mechanism between the BIOS of the electronic device and the operating system, so that the specific application can load the first target application by using the target memory address and run the first target application.

With reference to the application invocation implementation apparatus on the BIOS side described above, when the electronic device has two screens, the apparatus may include a second screen startup module and a startup interface output module. The second screen startup module is configured to start the second screen of the electronic device during the process of responding to the electronic device startup instruction. The startup interface output module is configured to output the startup interface of the electronic device on the second screen.

Figure 11:
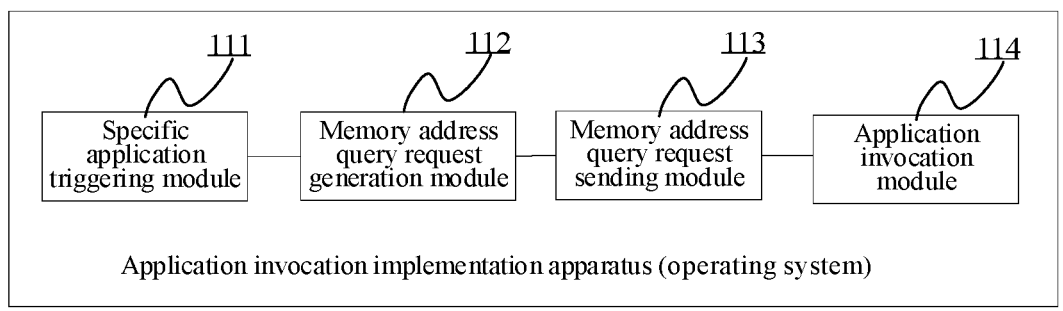
FIG. 11 is a schematic structural diagram of another example application invocation implementation apparatus consistent with the present disclosure.

FIG. 11 is a schematic structural diagram of another example application invocation implementation apparatus consistent with the present disclosure. A composition structure of the application invocation implementation apparatus is described from the side of the operating system of the electronic device. As shown in FIG. 11, the apparatus includes a specific application triggering module 111, a memory address query request generation module 112, a memory address query request sending module 113, and an application invocation module 114. The specific application triggering module 111 is configured to present at least one invocation entry identification corresponding to the first application in the BIOS on the first screen of the electronic device in response to the trigger operation for the specific application. The invocation entry identifications are generated after the corresponding first applications are initialized during the electronic device startup process. The memory address query request generation module 112 is configured to generate the memory address query request for the selected first target application in response to the selection invocation operation on the first applications. The memory address query request sending module 113 is configured to send the memory address query request to the BIOS, for the BIOS to respond to the memory address query request to obtain the target memory address of the first target application. The application invocation module 114 is configured to control the specific application to load the first target application and run the first target application according to the target memory address of the first target application fed back by the BIOS.

In some embodiments, the specific application triggering module 111 may include a trigger detection unit and an invocation entry identification presentation unit. The trigger detection unit is configured to detect the trigger operation corresponding to any preset startup mode configured for the specific application to start the specific application. The preset startup mode includes the hotkey startup mode, the voice startup mode, or the preset gesture startup mode. The invocation entry identification presentation unit is configured to present at least one invocation entry identification corresponding to the first application in the BIOS on the first screen of the electronic device. In some other embodiments, the trigger detection unit may include an entry identification presentation unit and an entry identification trigger unit. The entry identification presentation unit is configured to present the entry identification of the specific application on the second screen of the electronic device after the operating system of the electronic device is started. The entry identification trigger unit is configured to detect the trigger operation on the entry identification of the specific application.

The various modules, units, etc. in the apparatus described above can be stored in a memory of the corresponding side as program modules, and the corresponding program modules stored in the memory can be executed by the BIOS chip or the system processor to realize the corresponding functions. As for functions implemented by each program module and its combination, and technical effects achieved, reference may be made to the descriptions of the corresponding parts in the methods consistent with the present disclosure, which will not be repeated herein.

The present disclosure also provides a computer-readable storage medium on which a computer program can be stored, and the computer program can be invoked and loaded by a processor to implement each process of the application invocation implementation methods described in the foregoing embodiments.

Figure 12:
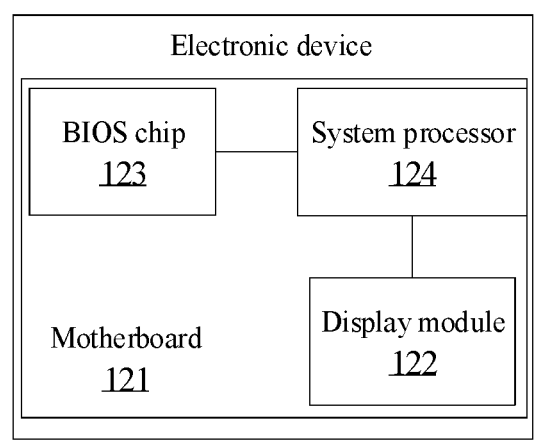
FIG. 12 is a schematic diagram of a hardware structure of an example electronic device applicable to an application invocation implementation method consistent with the present disclosure.

FIG. 12 is a schematic diagram of a hardware structure of an example electronic device applicable to the application invocation implementation method consistent with the present disclosure. The electronic device may include but is not limited to the various user terminals described above. As shown in FIG. 12, the electronic device includes a mainboard 121, and a display module 122, a BIOS chip 123, and a system processor 124 arranged at the mainboard 121.

The display module 122 may include at least one screen, such as the above-mentioned first screen and second screen, etc. The present disclosure does not limit layout of multiple screens in the electronic device, which may depend on the situation. The screen may be a touch display panel, which is convenient for the user to touch input. In this case, the display module 122 may further include a touch sensor unit for sensing touch events on the touch display panel.

The BIOS chip 123 can be configured to load and execute a pre-stored first program to implement the application invocation implementation method described above on the BIOS chip side. The system processor 124 can be configured to load and execute a pre-stored second program to implement the application invocation implementation method described above from the operating system side. The implementation processes are not repeated herein.

In the embodiments of the present disclosure, the system processor 124 may include a central processing unit (CPU), an application-specific integrated circuit (ASIC), a digital signal processor (DSP), a field-programmable gate array (FPGA), or another programmable logic device.

In some embodiments, the electronic device may further include a memory for storing the second program, such as a high-speed random-access memory, a non-volatile memory, etc., and the non-volatile memory may include at least one disk storage device or another volatile solid-state storage device.

According to actual application requirements, electronic devices with different functions or types may also include at least one input device such as a keyboard, a mouse, a camera, or a pickup, at least one output device such as a speaker, a vibration mechanism, or a lamp, a sensor module composed of various sensors, a power management module, a mobile communication module such as antennas, and various types of communication interfaces such as serial/parallel ports, USB ports, etc. configured to implement data transmission among internal devices of the electronic device. The description of the above embodiments and the structure of the electronic device shown in FIG. 12 do not constitute a limitation on the electronic device in the embodiments of the present disclosure. In practical applications, the electronic device may include more or less components than those described in the above embodiments or with some combined components, where are not listed herein.

Finally, in the above embodiments, unless the context clearly indicates an exception, the words "a," "an," "one," and/or "the" do not specifically refer to the singular, and may also include the plural. In general, the terms "include" and "includes" only imply that the clearly identified processes and elements are included. These processes and elements do not constitute an exclusive list, and the method or apparatus may also include other processes or elements. The inclusion of an element by the phrase "including a= . . . " does not preclude the presence of additional identical elements in the process, method, article of manufacture, or apparatus that includes the element.

In the description of the embodiments of the present disclosure, unless otherwise specified, "/" means "or." For example, A/B can mean A or B. In this specification "and/or" is only an association relationship that describes associated objects, which means that there can be three kinds of relationships. For example, A and/or B can mean three situations that A exists alone, A and B exist at the same time, and B exists alone. In addition, in the description of the embodiments of the present disclosure, "multiple" refers to two or more than two.

Terms such as "first," "second," etc. referred to in this specification are only for descriptive purposes and are used to distinguish one operation, unit or module from another operation, unit, or module, which do not necessarily require or imply there is any such actual relationship or order between these operations, units, or modules, nor can be understood as indicating or implying relative importance or indicating the number of technical features indicated. Thus, the features defined with "first" and "second" may expressly or implicitly include one or more of the features.

In addition, the various embodiments in this specification are described in a progressive or parallel manner. Each embodiment focuses on the differences from other embodiments, and for the same or similar parts between the various embodiments, reference can be made to each other. For the apparatuses and electronic devices disclosed in the embodiments, since they correspond to the methods disclosed in the embodiments, the descriptions are relatively simple, and for relevant information, reference can be made to the descriptions of the methods.

The foregoing description of the disclosed embodiments enables those skilled in the art to implement or use the present disclosure. Various modifications to these embodiments will be obvious to those skilled in the art, and the general principles defined herein can be implemented in other embodiments without departing from the spirit or scope of the present disclosure. Therefore, the present disclosure is not limited to the embodiments shown herein, but should conform to the widest scope consistent with the principles and novel features disclosed herein.

What is claimed is:

1. An application invocation implementation method comprising:
   initializing at least one first application in response to a startup instruction of an electronic device, and generating at least one invocation entry identification each corresponding to one of the at least one first application, the at least one first application being different from second applications running in an operating system of the electronic device;
   mapping the at least one invocation entry identification to a screen of the electronic device, for the screen to present the at least one invocation entry identification; and
   in response to a selection invocation request for one invocation entry identification of the at least one invocation entry identification, accessing memory address of one first application of the at least one first application corresponding to the one invocation entry identification, and running the one first application.

2. The method of claim 1, further comprising:
   partitioning memory space to obtain a custom memory space for storing the at least one first application, memory address of the custom memory space being marked as unavailable to the operating system;
   wherein accessing the memory address of the one first application includes accessing the memory address of the one first application stored in the custom memory space.

3. The method of claim 2, further comprising, during an operation of the operating system of the electronic device:
   receiving a memory address query request for a target application sent by a specific application, the specific application being one of the second applications, and the target application being one of the at least first application presented on the screen;
   obtaining target memory address of the target application in response to the memory address query request; and
   feeding back the target memory address to the specific application based on a sharing mechanism between a basic input and output system (BIOS) of the electronic device and the operating system, to enable the specific application to load the target application using the target memory address and run the target application.

4. The method of claim 1,
   wherein the screen is a first screen;
   the method further comprising:
      starting a second screen of the electronic device during a process of responding to the startup instruction of the electronic device; and
      outputting a startup interface of the electronic device on the second screen.

5. An application invocation implementation apparatus comprising:
   a memory storing a program that, when executed by a basic input and output system (BIOS) chip of an electronic device, causes the BIOS chip to implement the method of claim 1.

6. The apparatus of claim 5, wherein the program further causes the BIOS chip to:
   partition memory space to obtain a custom memory space for storing the at least one first application, memory address of the custom memory space being marked as unavailable to the operating system; and
   access the memory address of the one first application stored in the custom memory space.

7. The apparatus of claim 6, wherein the program further causes the BIOS chip to, during an operation of the operating system of the electronic device:
 receive a memory address query request for a target application sent by a specific application, the specific application being one of the second applications, and the target application being one of the at least first application presented on the screen;
 obtain target memory address of the target application in response to the memory address query request; and
 feed back the target memory address to the specific application based on a sharing mechanism between a BIOS of the electronic device and the operating system, to enable the specific application to load the target application using the target memory address and run the target application.

8. The apparatus of claim 5, wherein:
 the screen is a first screen; and
 the program further causes the BIOS chip to:
  start a second screen of the electronic device during a process of responding to the startup instruction of the electronic device; and
  output a startup interface of the electronic device on the second screen.

9. An application invocation implementation method comprising:
 responding to a trigger operation for a specific application and presenting at least one invocation entry identification on a screen of an electronic device, each of the at least one invocation entry identification corresponding to one of at least one first application, the at least one first application being in a basic input and output system (BIOS) of the electronic device and being different from second applications running in an operating system of the electronic device, the specific application being one of the second applications, and the at least one invocation entry identification being generated after the at least one first application is initialized during a startup process of the electronic device;
 generating a memory address query request for a target application in response to a selection invocation operation on the target application, the target application being one of the at least first application presented on the screen;
 sending the memory address query request to the BIOS;
 receiving target memory address of the target application obtained by the BIOS responding to the memory address query request; and
 controlling the specific application to load the target application and running the target application according to the target memory address of the target application fed back by the BIOS.

10. The method of claim 9, wherein responding to the trigger operation for the specific application includes starting the specific operation in response to detecting a trigger operation corresponding to a preset startup mode configured for the specific application, the preset startup mode including a hotkey startup mode, a voice startup mode, or a preset gesture startup mode.

11. The method of claim 10, wherein:
 the screen is a first screen; and
 detecting the trigger operation corresponding to the preset startup mode configured for the specific application includes:
  presenting an entry identification of the specific application on a second screen of the electronic device after the operating system of the electronic device is started; and
  detecting a trigger operation on the entry identification of the specific application.

12. An application invocation implementation apparatus comprising:
 a memory storing a program that, when executed by a system processor of an electronic device, causes the system processor to implement the method of claim 9.

13. The apparatus of claim 12, wherein the program further causes the system processor to start the specific operation in response to detecting a trigger operation corresponding to a preset startup mode configured for the specific application, the preset startup mode including a hotkey startup mode, a voice startup mode, or a preset gesture startup mode.

14. The apparatus of claim 13, wherein:
 the screen is a first screen; and
 the program further causes the system processor to:
  present an entry identification of the specific application on a second screen of the electronic device after the operating system of the electronic device is started; and
  detect a trigger operation on the entry identification of the specific application.

15. An electronic device comprising:
 a screen;
 a mainboard;
 a basic input and output system (BIOS) chip arranged at the mainboard and configured to:
  initialize at least one first application in response to a startup instruction of the electronic device, and generate at least one invocation entry identification each corresponding to one of the at least one first application, the at least one first application being different from second applications running in an operating system of the electronic device;
  map the at least one invocation entry identification to the screen, for the screen to present the at least one invocation entry identification; and
  in response to a selection invocation request for one invocation entry identification of the at least one invocation entry identification, access memory address of one first application of the at least one first application corresponding to the one invocation entry identification, and run the one first application; and
 a system processor arranged at the mainboard and configured to:
  respond to a trigger operation for a specific application and present the at least one invocation entry identification on the screen, the specific application being one of the second applications;
  generate a memory address query request for a target application in response to a selection invocation operation on the target application, the target application being one of the at least first application presented on the screen; and
  send the memory address query request to a BIOS of the electronic device; wherein:
   the BIOS chip is further configured to respond to the memory address query request to obtain target memory address of the target application; and the system processor is further configured to:
- receive the target memory address from the BIOS chip; and
- control the specific application to load the target application and run the target application according to the target memory address of the target application.

16. The electronic device of claim 15, wherein the BIOS chip is further configured to:
- partition memory space to obtain a custom memory space for storing the at least one first application, memory address of the custom memory space being marked as unavailable to the operating system; and
- access the memory address of the one first application stored in the custom memory space.

17. The electronic device of claim 15,
wherein the screen is a first screen;
the electronic device further comprising:
- a second screen;
- wherein the BIOS chip is further configured to:
  - start the second screen during a process of responding to the startup instruction of the electronic device; and
  - output a startup interface of the electronic device on the second screen.

18. The electronic device of claim 15, wherein the system processor is further configured to start the specific operation in response to detecting a trigger operation corresponding to a preset startup mode configured for the specific application, the preset startup mode including a hotkey startup mode, a voice startup mode, or a preset gesture startup mode.

19. The electronic device of claim 18,
wherein the screen is a first screen;
the electronic device further comprising:
- a second screen;
- wherein the system processor is further configured to:
  - present an entry identification of the specific application on a second screen of the electronic device after the operating system of the electronic device is started; and
  - detect a trigger operation on the entry identification of the specific application.

* * * * *